United States Patent
Chandrasekaran et al.

(10) Patent No.: US 7,280,026 B2
(45) Date of Patent: Oct. 9, 2007

(54) EXTENDED E MATRIX INTEGRATED MAGNETICS (MIM) CORE

(75) Inventors: Sriram Chandrasekaran, Burbank, CA (US); Vivek Mehrotra, Newbury Park, CA (US)

(73) Assignee: ColdWatt, Inc., Austin, TX (US)

( * ) Notice: Subject to any disclaimer, the term of this patent is extended or adjusted under 35 U.S.C. 154(b) by 172 days.

(21) Appl. No.: 10/922,067

(22) Filed: Aug. 19, 2004

(65) Prior Publication Data

US 2005/0024179 A1    Feb. 3, 2005

Related U.S. Application Data

(63) Continuation-in-part of application No. 10/302,095, filed on Nov. 21, 2002, now Pat. No. 7,046,523, and a continuation-in-part of application No. 10/126,477, filed on Apr. 18, 2002, now Pat. No. 6,873,237.

(51) Int. Cl.
  *H01F 27/24* (2006.01)
(52) U.S. Cl. ..................................... 336/212
(58) Field of Classification Search ............... 336/65, 336/83, 170, 178, 200, 212–215
  See application file for complete search history.

(56) References Cited

U.S. PATENT DOCUMENTS

| | | | |
|---|---|---|---|
| 1,376,978 A * | 5/1921 | Stoekle ..................... | 323/331 |
| 3,358,210 A | 12/1967 | Grossoehme | |
| 3,433,998 A | 3/1969 | Woelber | |
| 3,622,868 A | 11/1971 | Todt | |
| 3,681,679 A | 8/1972 | Chung | |
| 3,708,744 A | 1/1973 | Stephens et al. | |
| 4,019,122 A | 4/1977 | Ryan | |
| 4,075,547 A | 2/1978 | Wroblewski | |
| 4,327,348 A * | 4/1982 | Hirayama ................... | 336/184 |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |
| 4,581,691 A | 4/1986 | Hock | |

(Continued)

FOREIGN PATENT DOCUMENTS

JP   3215911   9/1991
JP   2000-68132   3/2000

OTHER PUBLICATIONS

Xu, et al., Design of 48V Voltage Regulator Modules with a Novel Integrated Magnetics, IEEE Transactions on Power Electronics, vol. 17, No. 6 (Nov. 2002), pp. 990-998.

(Continued)

*Primary Examiner*—Tuyen T. Nguyen
(74) *Attorney, Agent, or Firm*—Slater & Matsil, L.L.P.

(57) ABSTRACT

A matrix integrated magnetics (MIM) "Extended E" core in which a plurality of outer legs are disposed on a base and separated along a first outer edge to define windows therebetween. A center leg is disposed on the top region of the base and separated from the outer legs to define a center window. The center leg is suitably positioned along a second outer edge opposite the first or between outer legs positioned along opposing outer edges. A plate is disposed on the outer legs opposite the base.

18 Claims, 6 Drawing Sheets

U.S. PATENT DOCUMENTS

| | | | |
|---|---|---|---|
| 4,636,823 A | 1/1987 | Margalit et al. | |
| 4,660,136 A | 4/1987 | Montorefano | |
| 4,823,249 A | 4/1989 | Garcia, II | |
| 4,887,061 A * | 12/1989 | Matsumura | 336/178 |
| 4,899,271 A | 2/1990 | Seiersen | |
| 4,903,089 A | 2/1990 | Hollis et al. | |
| 4,999,759 A | 3/1991 | Cavagnolo et al. | |
| 5,068,756 A | 11/1991 | Morris et al. | |
| 5,106,778 A | 4/1992 | Hollis et al. | |
| 5,126,714 A | 6/1992 | Johnson | |
| 5,132,888 A | 7/1992 | Lo et al. | |
| 5,134,771 A | 8/1992 | Lee et al. | |
| 5,206,621 A | 4/1993 | Yerman | |
| 5,223,449 A | 6/1993 | Morris et al. | |
| 5,231,037 A | 7/1993 | Yuan et al. | |
| 5,244,829 A | 9/1993 | Kim | |
| 5,291,382 A | 3/1994 | Cohen | |
| 5,305,191 A | 4/1994 | Loftus, Jr. | |
| 5,335,163 A | 8/1994 | Seiersen | |
| 5,336,985 A | 8/1994 | McKenzie | |
| 5,342,795 A | 8/1994 | Yuan et al. | |
| 5,369,042 A | 11/1994 | Morris et al. | |
| 5,374,887 A | 12/1994 | Drobnik | |
| 5,407,842 A | 4/1995 | Morris et al. | |
| 5,468,661 A | 11/1995 | Yuan et al. | |
| 5,508,903 A | 4/1996 | Alexndrov | |
| 5,554,561 A | 9/1996 | Plumton | |
| 5,555,494 A | 9/1996 | Morris | |
| 5,610,085 A | 3/1997 | Yuan et al. | |
| 5,624,860 A | 4/1997 | Plumton et al. | |
| 5,663,876 A | 9/1997 | Newton et al. | |
| 5,700,703 A | 12/1997 | Huang et al. | |
| 5,712,189 A | 1/1998 | Plumton et al. | |
| 5,719,544 A | 2/1998 | Vinciarelli et al. | |
| 5,734,564 A | 3/1998 | Brkovic | |
| 5,736,842 A | 4/1998 | Jovanovic | |
| 5,742,491 A | 4/1998 | Bowman et al. | |
| 5,747,842 A | 5/1998 | Plumton | |
| 5,756,375 A | 5/1998 | Celii et al. | |
| 5,760,671 A | 6/1998 | Lahr et al. | |
| 5,783,984 A | 7/1998 | Keuneke | |
| 5,784,266 A | 7/1998 | Chen | |
| 5,804,943 A | 9/1998 | Kollman et al. | |
| 5,815,386 A | 9/1998 | Gordon | |
| 5,870,299 A | 2/1999 | Rozman | |
| 5,886,508 A | 3/1999 | Jutras | |
| 5,889,298 A | 3/1999 | Plumton et al. | |
| 5,909,110 A | 6/1999 | Yuan et al. | |
| 5,910,665 A | 6/1999 | Plumton et al. | |
| 5,920,475 A | 7/1999 | Boylan et al. | |
| 5,925,088 A | 7/1999 | Nasu | |
| 5,933,338 A | 8/1999 | Wallace | |
| 5,956,245 A | 9/1999 | Rozman | |
| 5,956,578 A | 9/1999 | Weitzel et al. | |
| 5,999,066 A | 12/1999 | Saito et al. | |
| 6,008,519 A | 12/1999 | Yuan et al. | |
| 6,011,703 A | 1/2000 | Boylan et al. | |
| 6,038,154 A | 3/2000 | Boylan et al. | |
| 6,069,799 A | 5/2000 | Bowman et al. | |
| 6,084,792 A | 7/2000 | Chen et al. | |
| 6,094,038 A | 7/2000 | Lethellier | |
| 6,097,046 A | 8/2000 | Plumton | |
| 6,156,611 A | 12/2000 | Lan et al. | |
| 6,163,466 A | 12/2000 | Davila, Jr. et al. | |
| 6,181,231 B1 | 1/2001 | Bartilson | |
| 6,188,586 B1 | 2/2001 | Farrington et al. | |
| 6,191,964 B1 | 2/2001 | Boylan et al. | |
| 6,208,535 B1 | 3/2001 | Parks | |
| 6,215,290 B1 | 4/2001 | Yang et al. | |
| 6,218,891 B1 | 4/2001 | Lotfi et al. | |
| 6,229,197 B1 | 5/2001 | Plumton et al. | |
| 6,309,918 B1 | 10/2001 | Huang et al. | |
| 6,320,490 B1 | 11/2001 | Clayton | |
| 6,323,090 B1 | 11/2001 | Zommer | |
| 6,348,848 B1 | 2/2002 | Herbert | |
| 6,351,396 B1 | 2/2002 | Jacobs | |
| 6,356,462 B1 | 3/2002 | Jang et al. | |
| 6,362,986 B1 | 3/2002 | Schultz et al. | |
| 6,380,836 B2 | 4/2002 | Matsumoto et al. | |
| 6,388,898 B1 | 5/2002 | Fan et al. | |
| 6,392,902 B1 | 5/2002 | Jang et al. | |
| 6,414,578 B1 | 7/2002 | Jitaru | |
| 6,477,065 B2 | 11/2002 | Parks | |
| 6,483,724 B1 | 11/2002 | Blair et al. | |
| 6,489,754 B2 | 12/2002 | Blom | |
| 6,501,193 B1 | 12/2002 | Krugly | |
| 6,512,352 B2 | 1/2003 | Qian | |
| 6,525,603 B1 | 2/2003 | Morgan | |
| 6,539,299 B2 | 3/2003 | Chatfield et al. | |
| 6,549,436 B1 | 4/2003 | Sun | |
| 6,661,276 B1 | 12/2003 | Chang | |
| 6,683,797 B2 | 1/2004 | Zaitsu et al. | |
| 6,696,910 B2 | 2/2004 | Nuytkens et al. | |
| 6,741,099 B1 | 5/2004 | Krugly | |
| 6,765,810 B2 | 7/2004 | Perry | |
| 6,775,159 B2 | 8/2004 | Webb et al. | |
| 6,867,678 B2 | 3/2005 | Yang | |
| 6,873,237 B2 | 3/2005 | Chandrasekaran et al. | |
| 6,980,077 B1 | 12/2005 | Chandrasekaran et al. | |
| 7,012,414 B1 | 3/2006 | Mehrotra et al. | |
| 7,046,523 B2 | 5/2006 | Sun et al. | |
| 7,076,360 B1 | 7/2006 | Ma | |
| 2002/0114172 A1 | 8/2002 | Webb et al. | |
| 2003/0197585 A1 | 10/2003 | Chandrasekaran et al. | |
| 2003/0198067 A1 | 10/2003 | Sun et al. | |
| 2006/0038549 A1 | 2/2006 | Mehrotra et al. | |
| 2006/0038649 A1 | 2/2006 | Mehrotra et al. | |
| 2006/0038650 A1 | 2/2006 | Mehrotra et al. | |
| 2006/0187684 A1 | 8/2006 | Chandrasekaran et al. | |
| 2006/0197510 A1 | 9/2006 | Chandrasekaran | |
| 2006/0198173 A1 | 9/2006 | Rozman | |
| 2006/0226477 A1 | 10/2006 | Brar et al. | |
| 2006/0226478 A1 | 10/2006 | Brar et al. | |
| 2006/0255360 A1 | 11/2006 | Brar et al. | |

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., " Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic An Avenue for Higher Power Density and Efficiency in Power Converters," Twelfth Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE Eleventh Annual Applied Power Electonics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Liu, W., "Fundamentals of III-V Devices: HBTs, MESFETs, and HFETs/HEMTs," §5-5: Modulation Doping, 1999, pp. 323-330, John Wiley & Sons, New York, NY.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," Proceedings of INTELEC '98, 1998, 9 pp., Paper 2-3, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Weitzel, C.E., "RF Power Devices for Wireless Communications," 2002 IEEE MTT-S CDROM, 2002, pp. 285-288, paper TU4B-1, IEEE., Los Alamitos, CA.

Williams, R., "Modern GaAs Processing Methods," 1990, pp. 66-67, Artech House, Inc., Norwood, MA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

* cited by examiner

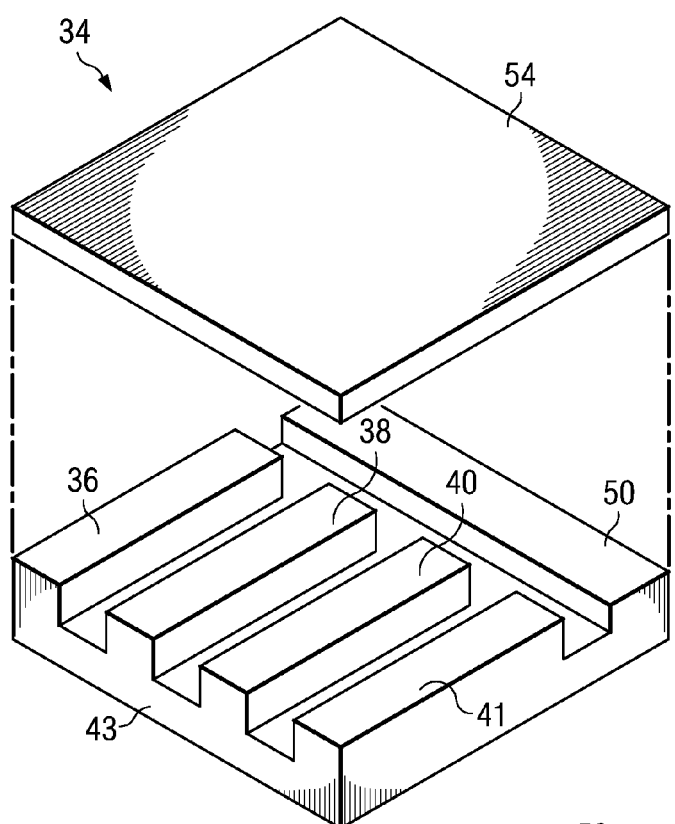
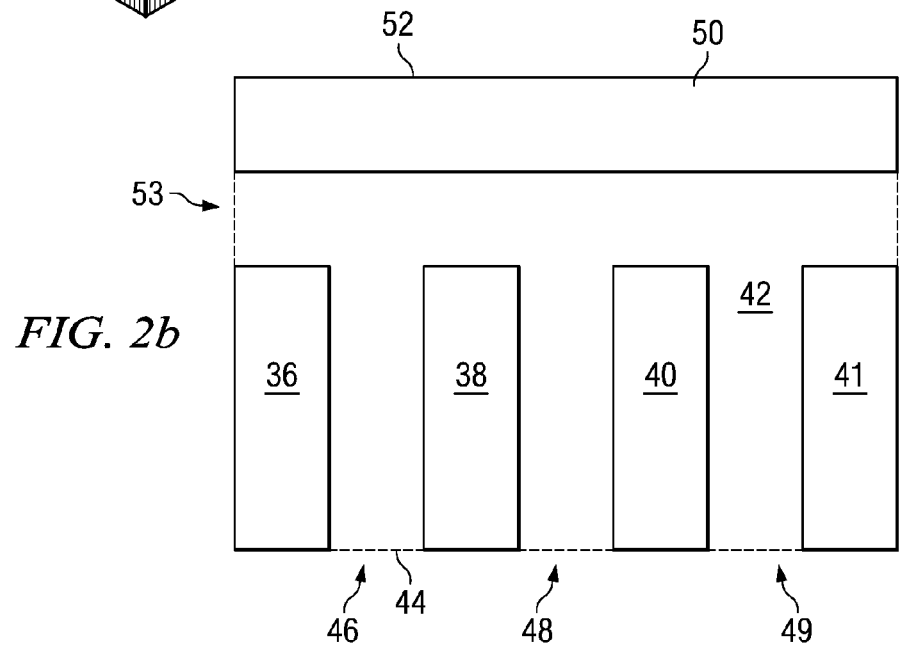
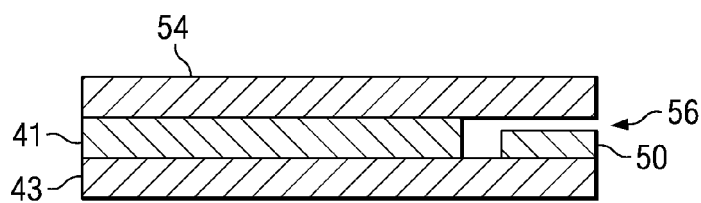

EXTENDED E MATRIX INTEGRATED MAGNETICS (MIM) CORE

CROSS-REFERENCE TO RELATED APPLICATIONS

This application is a continuation-in-part of applications Ser. No. 10/126,477, filed Apr. 18, 2002, now U.S. Pat. No. 6,873,237, and Ser. No. 10/302,095, filed Nov. 21, 2002, now U.S. Pat. No. 7,046,523, which are hereby incorporated by reference.

DESCRIPTION OF THE RELATED ART

1. Field of the Invention

This invention relates to the field of switched-mode power converters, and particularly to a matrix integrated magnetics (MIM) core structure.

2. Description of the Related Art

Switch-mode power converters are key components in many military and commercial systems for the conversion, control and conditioning of electrical power and often govern performance and size. Power density, efficiency and reliability are key metrics used to evaluate power converters. Transformers and inductors used within power converters constitute a significant percentage of their volume and weight, and hence determine power density, specific power, efficiency and reliability.

Integrated magnetics provides a technique to combine multiple inductors and/or transformers in a single magnetic core. They are specifically amenable to interleaved current multiplier converter topologies where the input or output current is shared between multiple inductors. Integrated magnetics offers several advantages such as improved power density and reduced cost due to elimination of discrete magnetic components, reduced switching ripple in inductor currents over a discrete implementation and higher efficiency due to reduced magnetic core and copper losses.

The integrated magnetics assembly 10 shown in FIG. 1a for a current-doubler rectifier (CDR) comprises an E-core 12 and plate 14 wound with split-primary windings 16 and 18, secondary windings 20 and 22, and an inductor winding 24 (see U.S. Pat. No. 6,549,436). This assembly integrates a transformer and three inductors in a single E-core as shown in the equivalent circuit of FIG. 1b. As a result, the magnetic flux in the core consists of transformer and inductor components. The center leg of the E-core is in the inductive flux path, and hence is gapped to prevent core saturation and provide energy storage. A high permeability path is maintained for a transformer flux component to ensure good magnetic coupling between the primary and secondary windings. The inductive flux components 27 and 29 flow through the outer legs 26, 28, the center leg 30, and the air gap 32, and complete through the top plate 14 and the base 30. The transformer component 25 of the flux circulates in the outer legs 26 and 28, the top plate 14 and the base 31, which form a high permeability path around the E-core 12.

The two windings 20 and 22 perform the dual operation of transformer secondary windings and the two inductor windings of a two-phase interleaved current multiplier or, in other words, a current doubler. Accordingly, the secondary winding currents are shifted in phase by one half of the switching period resulting in reduced switching ripple in their sum. The center leg winding 24 carries the sum of the secondary winding currents and provides additional filtering inductance, thereby achieving further reduction in the current switching ripple. Hence, interleaved converter topologies reduce switching ripple in the input or output current by using multiple smaller inductors and a lower switching frequency, resulting in high power density and efficiency. For applications where higher currents (>50 A) are required at low (<3.3V) to moderate (~12V) voltages at high efficiency and power density, two-phase interleaving might be inadequate to meet switching ripple specifications on the inductor currents and output voltage. A larger output capacitor can reduce output voltage ripple but will increase the volume and weight of the converter and result in sluggish transient response in response to dynamic load conditions. Multi-phase interleaved current multipliers will be required for such applications. However, utilizing multiple discrete E-cores to implement multiphase interleaving topologies increases component count and interconnect losses, resulting in poor power density and efficiency.

An additional limitation to using E-cores for high current applications is the detrimental effect of the fringing flux due to the limited cross sectional area of the gapped center leg. The fringing flux represents the flux component that strays away from the main magnetic path and spills into the core window inducing eddy currents in the windings therein. This results in increased $I^2R$ losses in the windings and reduced efficiency. To reduce eddy current induction due to fringing flux, the windings are placed a safe distance away from the air gap resulting in poor utilization of the core window area. In addition, the fringing flux represents a loss of inductance which results in increased switching ripple in the winding currents, leading to higher $I^2R$ losses and poor efficiency.

SUMMARY OF THE INVENTION

The present invention discloses a matrix integrated magnetics (MIM) core structure that provides a single, low profile core solution for both isolated and non-isolated converter topologies, is easier and less expensive to fabricate, is scalable to an arbitrary number of interleaving phases and provides a minimal length for an additional inductor winding around the center leg.

This is accomplished with an "Extended E" configuration in which at least three outer legs are disposed on the top region of a base and separated along a first outer edge to define windows therebetween. A center leg is disposed on the top region of the base and separated from the outer legs to define a center window. In one embodiment, the center leg lies along a second outer edge parallel to the first. In another embodiment, a like plurality of outer legs are disposed along a second outer edge with the center leg disposed therebetween. A plate is disposed on the outer legs opposite the base. An air gap may or may not be formed between the plate and center leg depending on whether the core is formed from a single high permeability material or formed from a composite of the high permeability material and a low permeability, high saturation material.

The number of outer legs is equal to the number of interleaving phases for an interleaving current multiplier topology. The primary and secondary windings for an isolated converter or inductor windings for a non-isolated topology are wound around the outer legs with an additional optional inductor winding that can be wound around the center leg for additional filtering inductance.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a through 2c are different views of an Extended E matrix integrated magnetics (MIM) core in accordance with the present invention;

DETAILED DESCRIPTION OF THE INVENTION

Figure 1A:
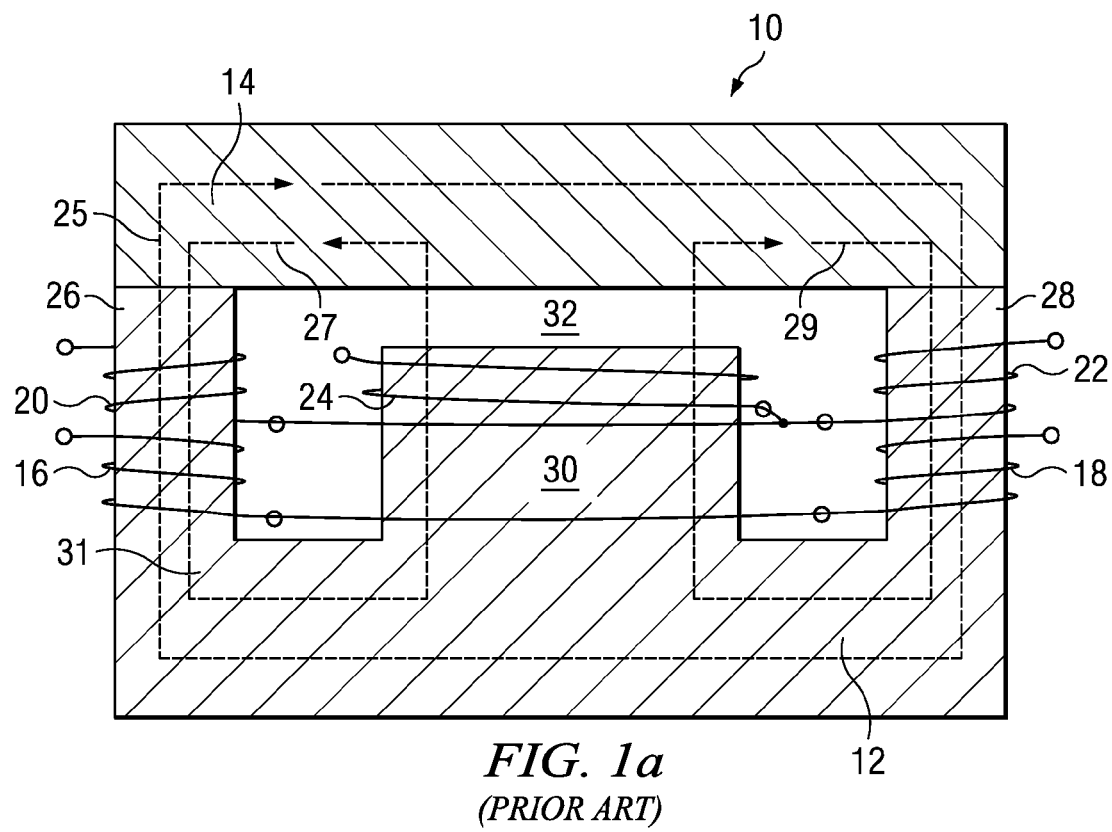
FIGS. 1a and 1b, as described above, are the winding diagram of a standard E-core and the equivalent circuit respectively for an isolated current doubler rectifier (CDR) with an additional center leg winding.
Figure 1B:
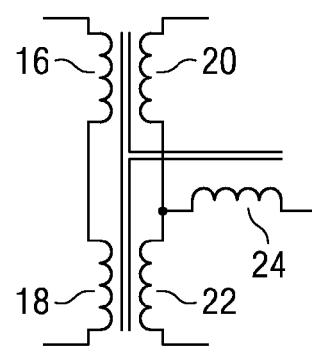

The present invention provides a matrix integrated magnetics (MIM) core structure, that provides a single, low profile core solution for both isolated and non-isolated converter topologies, is easier and less expensive to fabricate, is scalable to an arbitrary number of interleaving phases and provides a minimal length for an additional inductor winding around the center leg.

Copending U.S. patent applications Ser. No. 10/126,477 entitled "Core Structure" filed Apr. 18, 2002 and Ser. No. 10/302,095 entitled "Core Structure and Interleaved DC-DC Converter Topology" filed Nov. 21, 2002 introduce MIM core structures in cross and radial configurations. The basic MIM core provides for low profile magnetics due to higher center leg cross sectional area and lower air gap height, better core utilization and uniform flux distribution, and improved efficiency and lower losses over conventional E-core designs. The copending applications describe how the MIM core can be used for multiphase current multiplier topologies to effectively reduce switching ripple in the input/load current and the output voltage without having to increase the switching frequency or inductance.

An "Extended E" embodiment of the MIM core structures incorporates the same principles with additional advantages of fabrication simplicity, scalability and minimum winding lengths for an additional center leg inductor winding. The Extended E MIM core is a simpler structure that can be easily machined from a single block of core material or can be formed by bringing together multiple blocks. The core can be scaled up to include additional outer legs by simply making the center leg longer and adding another outer leg or by adding outer legs on the other side of the center leg. The number of outer legs is equal to the number of interleaving phases for an interleaving current multiplier topology. The perimeter of the rectangular center leg is shorter than that of either the cross or radial center legs, which reduces the resistance of the additional center leg inductor winding.

As shown in FIGS. 2a-2c, an embodiment of the Extended E core 34 includes at least first, second and third outer legs 36, 38 and 40, respectively, disposed on the top region 42 of a base 43 and separated along a first outer edge 44 to define first, second, ... windows 46, 48 there between. A fourth outer leg 41 and third window 49 are also included in this embodiment. A center leg 50 is disposed on the top region 42 of the base 43 along a second outer edge 52 and separated from the first, second and third legs to define a center window 53. The base 43, outer legs 36, 38, 40 and 41 and the center leg 50 may be machined from a single block of magnetic material or joined together from multiple blocks that are fabricated separately. A plate 54 is disposed on the first, second and third legs opposite the base. If the core is formed from a single high permeability material such as ferrite, silicon steel or metglas laminations, an air gap 56 is formed between the plate 54 and center leg 50 to avoid core saturation.

Figure 3:
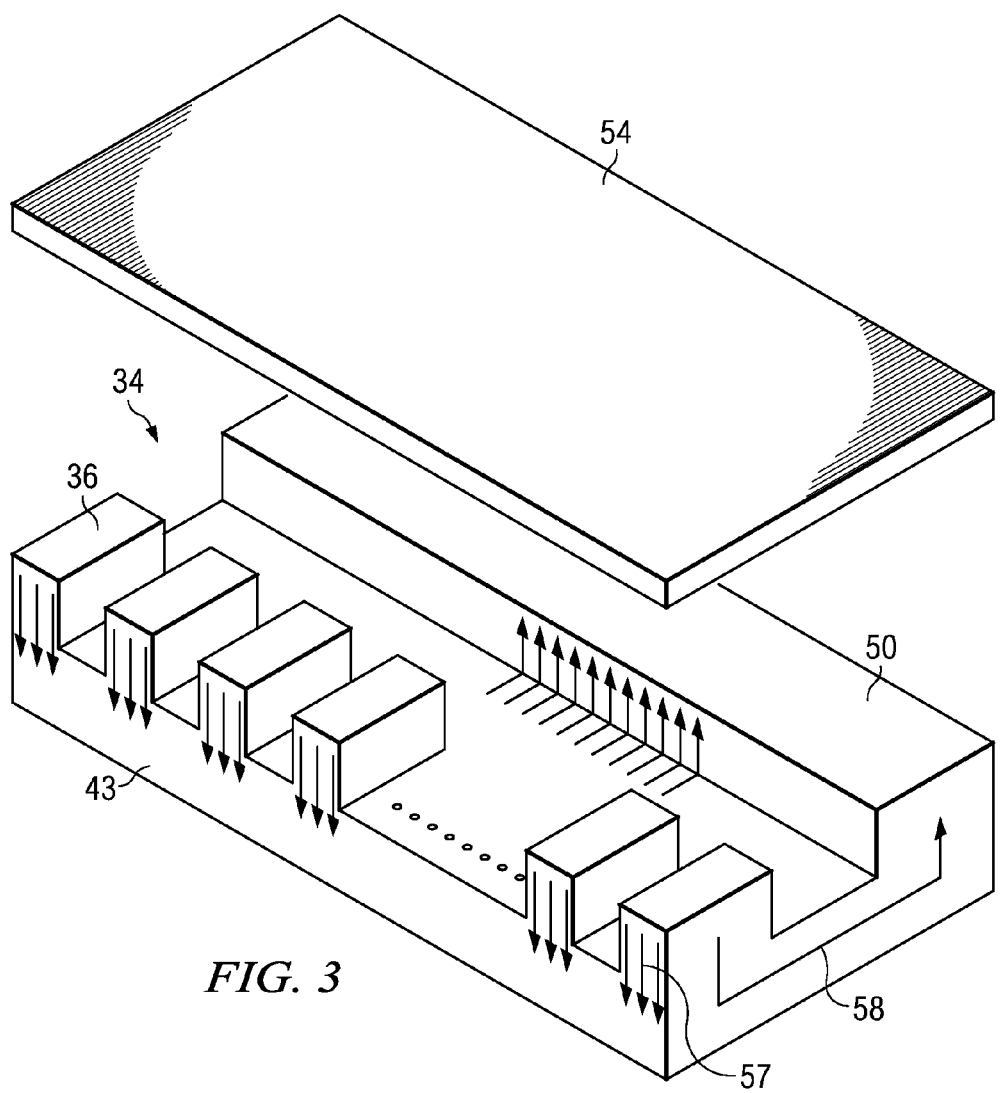
FIG. 3 is a diagram of the Extended E MIM core illustrating accumulation of magnetic flux from the outer legs in the shared center leg.
Figure 4A:
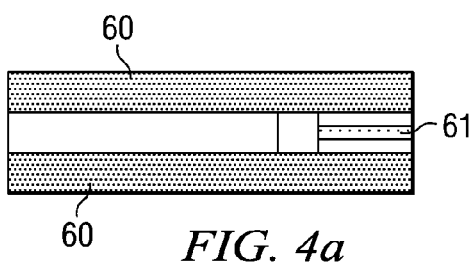
FIGS. 4a through 4d are section views of a composite Extended E MIM core for isolated and non-isolated converters.
Figure 4B:
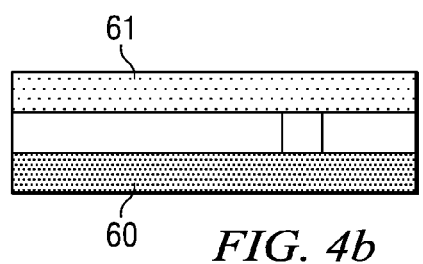
Figure 4C:
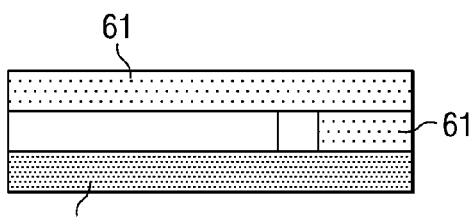
Figure 4D:
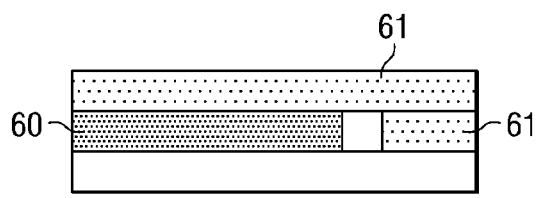

As illustrated in FIG. 3, the inductive flux component 57 in either an isolated or non-isolated power converter circulates in a low permeability path 58 from the outer legs, through base 43, through center leg 50, across the low permeability air gap 56 and returns through plate 54. In an isolated power converter, the transformer flux components (not shown), algebraically adding to zero, would circulate in a high permeability path through the outer legs, the plate and the base, avoiding the center leg and air gap.

As described in the copending applications, one benefit of the MIM core is its cellular nature. Depending on the power converter topology, a cell could consist of one or two outer legs and the corresponding windings therein. This cellular topology can be used to provide a plurality of output voltages or to implement interleaved current multiplier topologies to reduce switching ripple in the load/input current and output voltage. For interleaved current multiplier topologies, if the converter is based on a full bridge topology, each outer leg and the windings therein will constitute a cell and the number of interleaving phases will be equal to the number of outer legs. On the other hand, a cell will consist of two outer legs if the converter is based on a half-bridge topology. However, the number of outer legs will still equal the number of interleaving phases.

Another benefit of the MIM core structure is the presence of a shorter air gap 56 than would be found in a comparable typical E-core. Whereas a typical E-core has a center leg between the two outer legs, the core of the invention has a center leg, which may be considerably larger in comparison. The larger center leg may result in a shorter air gap. The shorter air gap has reduced fringing flux, meaning that the core may be more compact. For interleaved current multiplier topologies, the height of the air gap scales inversely with the number of interleaving phases. As a result, the MIM core, by virtue of its amenability to support interleaved topologies, enables a shortened air gap. This, in turn, reduces fringing flux enabling a better utilization of the core window, lower profile and lower $I^2R$ losses due to reduced eddy currents.

As illustrated in FIGS. 4a-4d, the core 34 may be formed from a composite of a high permeability material 60 and a low permeability, high saturation material 61 to eliminate the air gap as described in co-pending U.S. patent application "Composite Magnetic Core for Switch-Mode Power Converters," filed on Aug. 19, 2004, which is hereby incorporated by reference. In general, the use of a high permeability material reduces the number of winding turns required for a desired inductance. The composite core is configured so the low permeability, high saturation material is located where the flux accumulates from the high permeability sections of the core. In non-isolated converters, a portion of the center leg, base and or plate is formed from the low permeability, high saturation material. In an isolated converter, all or a portion of the center leg is formed from the low permeability, high saturation material in order to preserve a high permeability path for the transformer components of the flux. More specifically, a portion (some to all) of at least one of the base, center leg and the plate is formed of a first magnetic material having a first magnetic permeability ($\mu_{rel1}$) and a first saturation flux density ($B_{sat1}$) and the remainder of the core is formed of a secondary magnetic material with a second permeability ($\mu_{rel2}$) greater than the first by at least a factor of 10. This configuration balances the requirements of providing a core and winding structure with the desired inductance and minimum $I^2R$ losses, avoiding saturation of the composite core and suppressing or eliminating any fringing flux.

Figure 5A:
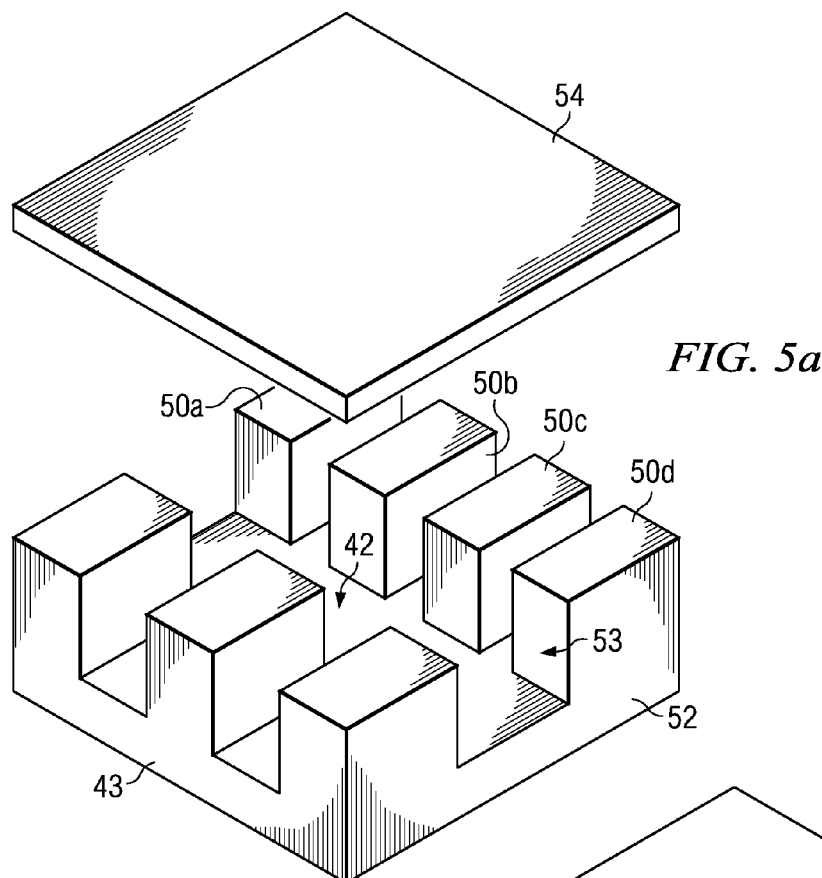
FIGS. 5a and 5b are alternate embodiments of the Extended E MIM core.
Figure 5B:
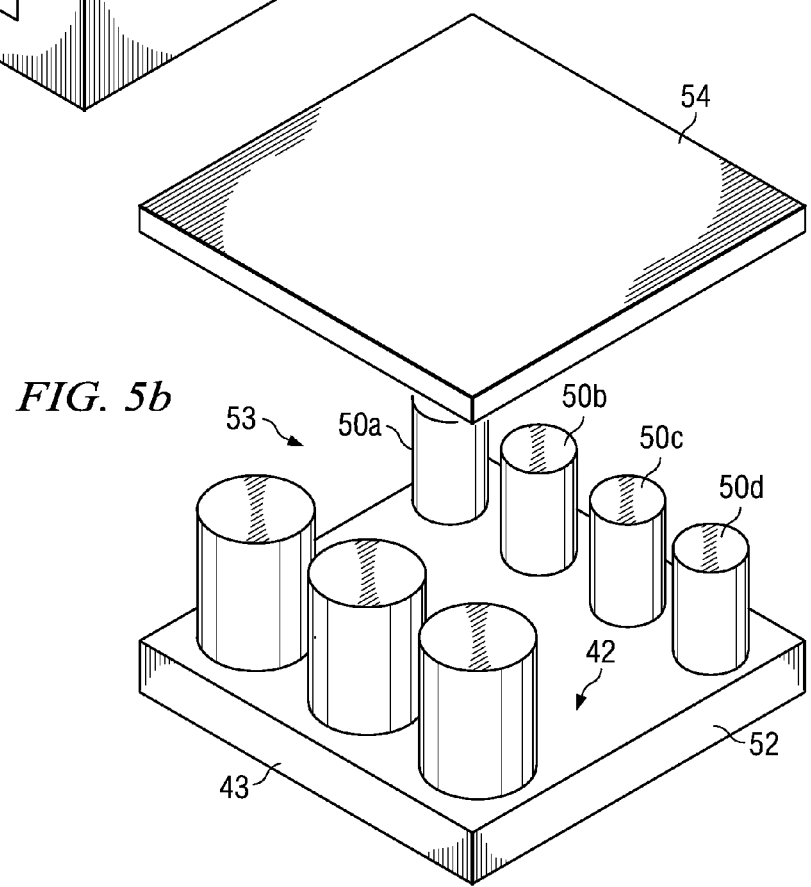

As shown in FIGS. 5a and 5b, the Extended E MIM core 34 can have a center leg 50 implemented with a plurality of center leg elements 50a, 50b, 50c . . . disposed on the top region 42 of the base 43 along the second outer edge 52 and separated from the first, second and third legs to define a center window 53. In FIG. 5a, the center leg elements are rectangular. In FIG. 5b, the center leg elements and outer legs are circular. Multiple center leg elements may be used to simplify fabrication and lower cost. Machining a large core from a single piece of material may be too expensive. It is less expensive to assemble multiple center leg elements to form the core. Circular legs eliminate flux crowding at the corners and thus provide a more uniform flux distribution. However, they are harder to fabricate and more expensive.

Figure 6A:
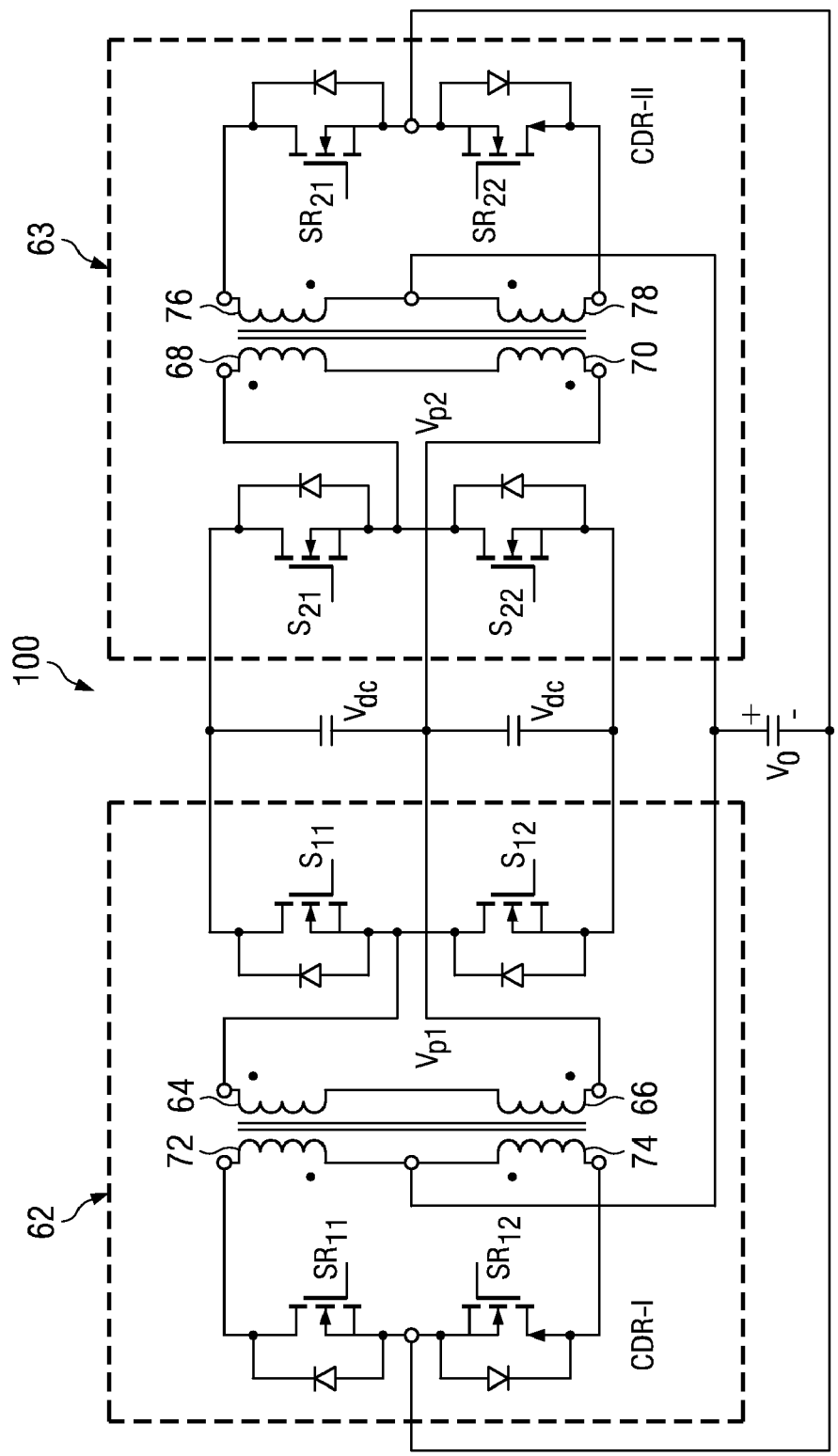
FIGS. 6a and 6b are a schematic of an isolated three-phase current multiplier topology and a winding diagram using the Extended E MIM core.
Figure 6B:
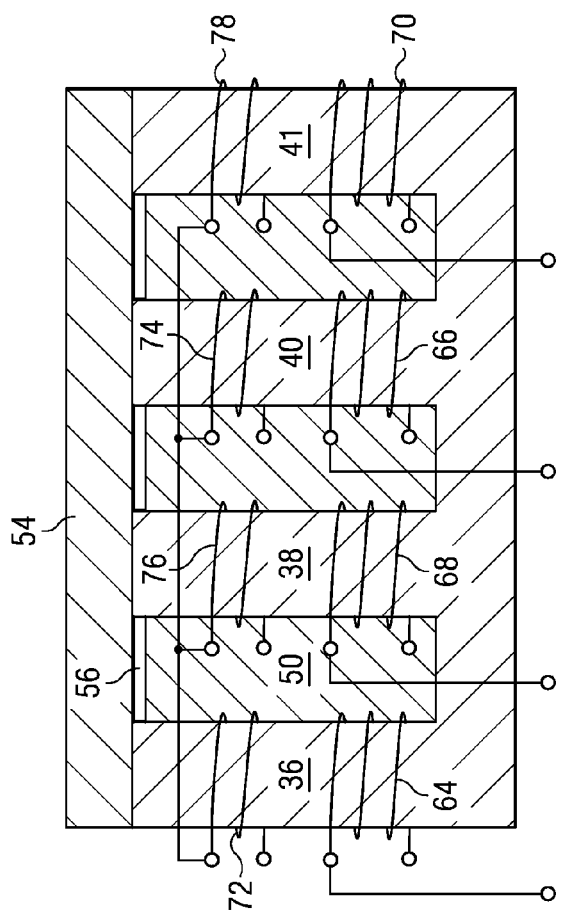

A power converter topology with reduced output voltage ripple was described in detail in copending application "Core Structure and Interleaved DC-DC Converter Technology." Application of the Extended E MIM Core structure to a 4-phase, isolated, half-bridge based interleaved current multiplier rectifier is shown in FIGS. 6a and 6b. The power converter 100 shown in FIG. 6a consists of two interleaved half-bridge CDRs 62 and 63. The two voltage sources denoted as $V_{dc}$ represent the input voltage to the two CDRs and the capacitor voltage $V_0$ represents the output of the converter. The load (not shown in FIG. 6b) is connected across the output capacitor. The two CDRs consist of two split primary windings 64, 66, 68 and 70 and four secondary windings 72, 74, 76 and 78. The two CDRs are shifted in phase by a fourth of the switching period in order to achieve 4-phase interleaving. The synthesis of a single core integrated magnetics solution for this converter using the Extended E MIM core structure is shown in FIG. 6b. A detailed description of this interleaved converter topology including timing diagrams and derivation of control signals is provided in the copending application.

Figure 7:
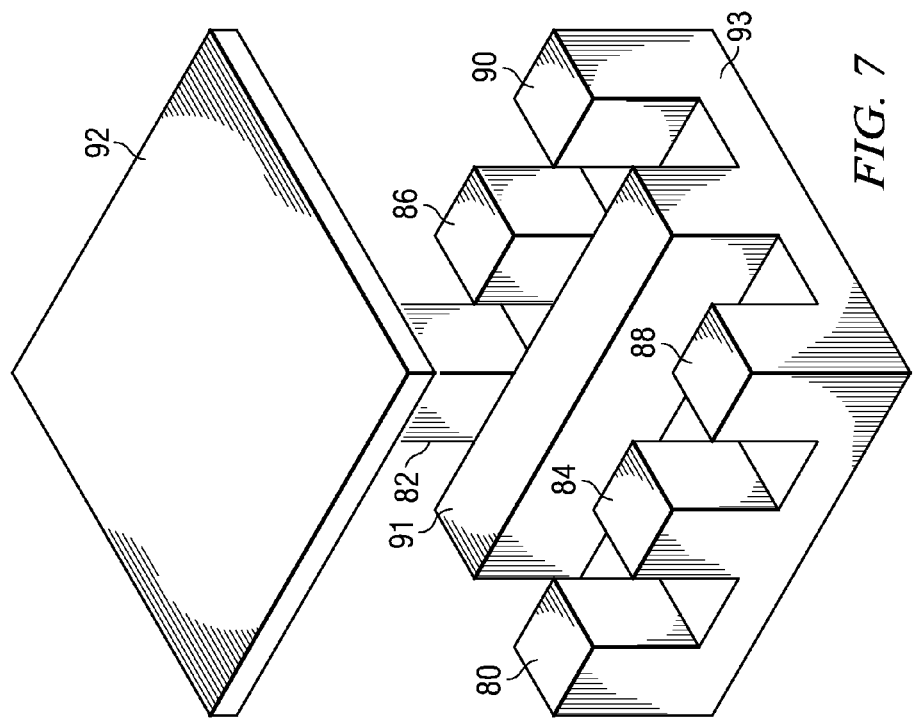
FIG. 7 is a diagram of an alternate implementation of an Extended E MIM core with outer legs disposed on opposite edges of a base with the center leg between them along the center of the base.

An alternate implementation of the Extended-E MIM core structure using 6 outer legs 80, 82, 84, 86, 88, 90 disposed on opposite edges of a rectangular base 93 with the center leg 91 disposed along a center line between the two edges of the base suitable for a 6-phase interleaved current multiplier and a top plate 92 is shown in FIG. 7. If this core were to be used to synthesize integrated magnetics for a 6-phase interleaved current multiplier synthesized as three half bridge CDRs, outer leg pairs 80 and 82, 84 and 86, and 88 and 90 will be used by each CDR. Each outer leg will house a primary and secondary winding (not shown in FIG. 7). An additional center leg winding can be used to increase the effective filtering inductance.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A matrix integrated magnetic (MIM) core, comprising:
   a base having a first outer edge;
   at least three outer legs on top of said base separated along said first outer edge defining windows between said outer legs;
   a center leg on said base that spans said outer legs and separated from said outer legs to define a center window; and
   a plate opposite said base that covers said outer legs and windows therebetween, said center leg and said center window.

2. The MIM core of claim 1, wherein said outer legs are disposed in a rectangular window, said center leg having a rectangular shape that is coextensive with said rectangular window.

3. The MIM core of claim 2, wherein said center leg is implemented through a multiplicity of center leg elements.

4. The MIM core of claim 3, wherein said outer legs and center leg elements are either rectangular or circular.

5. The MIM core of claim 1, wherein said center leg is one piece.

6. The MIM core of claim 1, where said outer legs are disposed substantially parallel to each other and substantially perpendicular to said center leg.

7. The MIM core of claim 1, wherein a width of said center window is constant between said center leg and each of said outer legs.

8. The MIM core of claim 1, wherein said center leg is shorter than said first, second and third outer legs and forms an air gap between said center leg and said plate.

9. The MIM Core of claim 1, wherein said plate lies on said center leg, a portion of at least one of said base, said center leg and said plate being formed of a first magnetic material having a first magnetic permeability ($\mu_{rel1}$) and a first saturation flux density ($B_{sat1}$) and the remainder of the core being formed of a secondary magnetic material with a second permeability ($\mu_{rel2}$) greater than said first magnetic permeability ($\mu_{rel1}$) by at least a factor of 10.

10. The MIM core of claim 1, further comprising a plurality of primary and secondary windings for an isolated power converter wound around said outer legs.

11. The MIM core of claim 10, further comprising a winding wound around said center leg.

12. The MIM core of claim 1, further comprising a plurality of inductor windings for a non-isolated power converter wound around said outer legs.

13. The MIM core of claim 12, further comprising a winding wound around said center leg.

14. The MIM core of claim 1, wherein said base has a second outer edge separated from said first outer edge by a top region, said center leg on said top region of said base along said second outer edge.

15. The MIM core of claim 1, wherein said base has a second outer edge separated from said first outer edge by a top region, said MIM core further comprising a plurality of outer legs on top of said base separated along said second outer edge defining windows between said outer legs, said center leg on said top region of said base disposed between and parallel to said outer legs along both said first and second outer edges to define two center windows.

16. A matrix integrated magnetic (MIM) core, comprising:
- a base having first and second parallel outer edges separated by a top region;
- at least three outer legs on top of said base along said first outer edge of said base defining windows therebetween;
- a center leg on said top region of said base disposed along said second outer edge that spans said outer legs and separated from said outer legs to define a center window; and
- a plate opposite the base that covers said outer legs and windows therebetween, said center leg and said center window.

17. The MIM core of claim 16, where said outer legs are disposed parallel to each other and perpendicular to said center leg.

18. The MIM core of claim 16, wherein a width of said center window is constant between said center leg and each of said outer legs.

* * * * *

UNITED STATES PATENT AND TRADEMARK OFFICE
CERTIFICATE OF CORRECTION

PATENT NO. : 7,280,026 B2 Page 1 of 1
APPLICATION NO. : 10/922067
DATED : October 9, 2007
INVENTOR(S) : Chandrasekaran et al.

It is certified that error appears in the above-identified patent and that said Letters Patent is hereby corrected as shown below:

Title Page 3, Item 56 (Other Publications), Column 1, line 20, replace "Electonics" with --Electronics-- .

In Col. 1, line 63, replace "period" with --period,-- .

In Col. 2, line 27, replace "air gap" with --air gap,-- .

In Col. 4, line 52, replace "fringing flux" with --fringing flux,-- .

In Col. 5, line 53, replace "Extended-E" with --Extended E-- .

Signed and Sealed this

Twenty-seventh Day of November, 2007

JON W. DUDAS
*Director of the United States Patent and Trademark Office*